US012649614B2

(12) United States Patent      (10) Patent No.:    US 12,649,614 B2
Forster et al.                      (45) Date of Patent:        Jun. 9, 2026

(54) CLOSING DEVICE FOR A CONTAINER

(71) Applicant: Frank Forster, Lucerne (CH)

(72) Inventors: Frank Forster, Lucerne (CH);
Francesco Catarci, Baar (CH)

(73) Assignee: Frank Forster, Lucerne (CH)

( * ) Notice:  Subject to any disclaimer, the term of this
patent is extended or adjusted under 35
U.S.C. 154(b) by 777 days.

(21) Appl. No.:    17/310,159

(22) PCT Filed:    Jan. 17, 2020

(86) PCT No.:    PCT/EP2020/051149
§ 371 (c)(1),
(2) Date:    Jul. 22, 2021

(87) PCT Pub. No.:    WO2020/152055
PCT Pub. Date: Jul. 30, 2020

(65)              Prior Publication Data
US 2021/0339920 A1      Nov. 4, 2021

(30)        Foreign Application Priority Data

Jan. 22, 2019    (CH) ..................................... 00069/19

(51) Int. Cl.
B65D 81/34        (2006.01)
A23L 5/10        (2016.01)
(Continued)

(52) U.S. Cl.
CPC ............ B65D 51/1644 (2013.01); A23L 5/15
(2016.08); B65D 33/1666 (2013.01); B65D
81/3461 (2013.01)

(58) Field of Classification Search
CPC  B65D 51/1644; B65D 81/3461; B65D 81/34;
B65D 81/3446; B65D 33/1658;
(Continued)

(56)              References Cited

U.S. PATENT DOCUMENTS 2,964,889  A    12/1960  Heinz et al.
3,704,140  A    11/1972  Petit et al.
(Continued)

FOREIGN PATENT DOCUMENTS

CN        101171185  A    4/2008
CN        102860747  A    1/2013
(Continued)

OTHER PUBLICATIONS

First Office Action for Chinese patent application No. 202080010006.0
dated Oct. 31, 2023.

*Primary Examiner* — Nathan J Newhouse
*Assistant Examiner* — Nina K Attel
(74) *Attorney, Agent, or Firm* — Brian Roffe

(57)              ABSTRACT

In a method for cooking food in a container, in particular in
a bag, the container, during heating, is opened at a particular
overpressure of the medium and closed when the overpres-
sure drops. A closing device is connected to the container
and equipped with a pressure relief valve by means of which
the container is opened at a particular overpressure of the
medium and closed when the overpressure drops. The clos-
ing device includes at least one inner elongate retaining
element and at least one sleeve body which surrounds the
retaining element. The container is provided with an open-
ing, and fed between the retaining element and sleeve body
and through a longitudinal slit in the sleeve body. The
retaining element and its surrounding sleeve body form the
pressure relief valve. Optimal cooking of the food intro-
duced into the container is achieved and fast preparation of
the food is possible.

19 Claims, 2 Drawing Sheets

(51) Int. Cl.
    *B65D 33/16*          (2006.01)
    *B65D 51/16*          (2006.01)

(58) Field of Classification Search
    CPC . B65D 33/1666; B65D 51/16; B65D 51/1633
    USPC ................................................... 383/69, 100
    See application file for complete search history.

(56)                 References Cited

U.S. PATENT DOCUMENTS

| | | | |
|---|---|---|---|
| 3,769,028 A | 10/1973 | Riley et al. | |
| 6,464,394 B1 * | 10/2002 | Galomb | B65D 33/2508 |
| | | | 24/30.5 R |
| 7,503,696 B2 * | 3/2009 | Ha | B65D 75/5861 |
| | | | 24/30.5 R |
| 2003/0152296 A1 | 8/2003 | Huffer | |
| 2010/0025392 A1 | 2/2010 | Nishi et al. | |
| 2014/0328978 A1 | 11/2014 | Shimada-Kreft et al. | |
| 2018/0208384 A1 * | 7/2018 | Ryszawy | B65D 33/1658 |
| 2019/0002182 A1 | 1/2019 | Chen et al. | |

FOREIGN PATENT DOCUMENTS

| | | | |
|---|---|---|---|
| EP | 3033948 A1 | 6/2016 | |
| GB | 534460 A | 3/1941 | |
| KR | 101398865 B1 | 5/2014 | |
| WO | 2008096388 A1 | 8/2008 | |
| WO | 2020152055 A1 | 7/2020 | |

* cited by examiner

CLOSING DEVICE FOR A CONTAINER

FIELD OF THE INVENTION

The invention relates to a method for cooking and/or preserving food in a container, in particular in a bag, and a closing device in which, during heating, the container opens at a specific excess pressure of the medium in the container and closes when the excess pressure drops.

BACKGROUND OF THE INVENTION

In a preferred cooking variant, foods are cooked in a heat-resistant, microwave-compliant and/or pressure-stable bag in a microwave device, a water bath, a steamer or the like, resulting in a number of advantages. Cooked food in such bags largely keeps its taste, and the state after cooking can be chosen as desired, whether for example the vegetable (s) is (are) intended still to be crunchy or, instead, soft. In particular when cooking in a microwave device, this is achieved within a few minutes, and thus whole menus can be prepared in a very short amount of cooking time, but still with high cooking quality.

OBJECTS AND SUMMARY OF THE INVENTION

The object of the invention is to improve known methods for cooking food in a container, in particular in a bag, such that controlled cooking is made possible, and in so doing, when filling, storing and removing food from the container, this is easy to handle.

This object is achieved according to the invention by a method for cooking food in a container, in particular in a bag, in which, during heating, the container opens at a specific excess pressure of the medium in the container and closes when the excess pressure of the medium drops, and wherein a closing device is connected to the container, which closing device is equipped with a pressure relief valve by which the container opens when at the specific excess pressure of the medium in the container or closes when the excess pressure of the medium in the container is reduced.

In the method according to the invention, a closing device is connected to the container, which device is equipped with a pressure relief valve by which the container is opened when the food filling same is being cooked at a specific excess pressure of the medium or closed when reducing the excess pressure.

On the one hand, the container can be closed very easily with this closing device and an optimum cooking of the food filling the container is achieved, by means of which the cooking process repeatedly produces the same result at a predetermined cooking performance, and in so doing a very quick preparation of the food is made possible.

According to the invention, this closing device has at least one inner longitudinal retaining element and at least one sleeve body surrounding same, in which this container provided with an opening can be guided between this retaining element and the sleeve body as well as through a longitudinal slit into the latter. The retaining element and the sleeve body surrounding same are designed such that they form this pressure relief valve.

Very advantageously, to form this pressure relief valve, a modifiable distance can be provided between the inner retaining element and the sleeve body at least partially transverse in the longitudinal extension of the sleeve body, which distance is increased when the excess pressure of the medium in the container increases and the container thereby opens, and is reduced when the excess pressure drops and the container is closed.

Expediently, an adjustable closing element is housed on this sleeve body, which element is designed preferably as a cover which can be moved back and forth. The leak tightness of the container connected to the closing device is ensured by this cover, in particular during preservation.

BRIEF DESCRIPTION OF THE DRAWINGS

The invention, as well as further advantages of same, are explained in more detail below using embodiment examples, and with reference to the drawings. There is shown in.

DETAILED DESCRIPTION OF THE INVENTION

Figures 1, 2, 3:
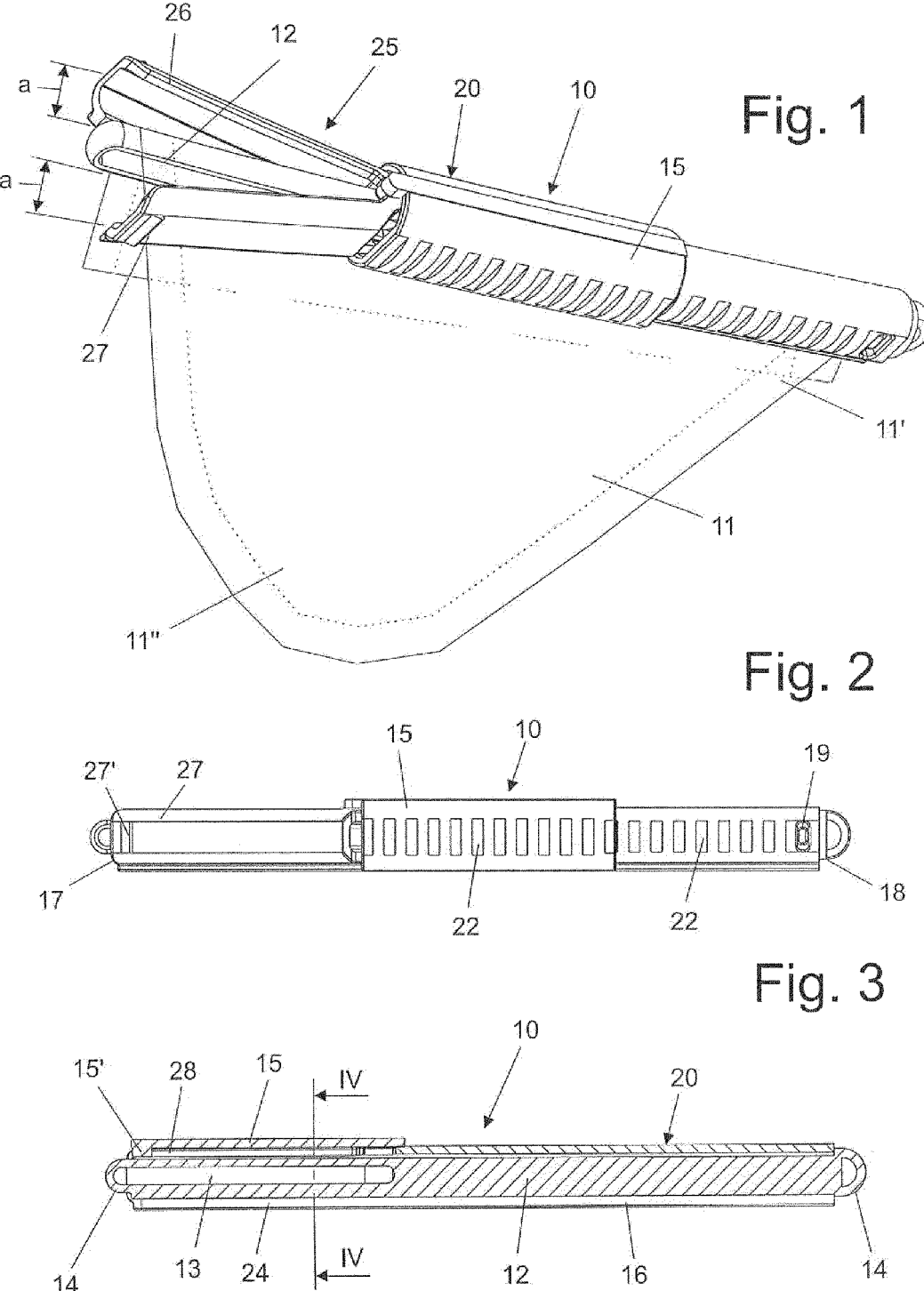
FIG. 1 shows a closing device according to the invention represented in perspective view, and a container connected thereto.
FIG. 2 is a top view of the closing device according to FIG. 1.
FIG. 3 is a longitudinal section through the closing device according to FIG. 1.

FIG. 1 to FIG. 4 illustrate a closing device according to the invention 10, which device has an inner longitudinal retaining element 12 as well as a sleeve body 20 surrounding same, i.e., outward of the inner longitudinal retaining element 12 and except for when a longitudinal slit 16 is present. An adjustable closing element is housed on this sleeve body 20, which element is designed as a cover 15 which can be moved forwards and backwards. In the position shown in FIG. 1, the sleeve is located approximately in the center of the sleeve body 20 in the open position explained herein-after, while according to FIG. 3 it is pushed into the closed position. This cover 15, which is less than half as long as the sleeve body 20, has a longitudinal slit 16 almost the same as that of sleeve body 20. Self-evidently, this cover 15 could look different in terms of length and shape.

FIG. 1 shows closing device 10 and container 11 provided with an opening, which container is guided through longi-tudinal slit 16 and about this retaining element 12 between same and sleeve body 20 as well as, in turn, through longitudinal slit 16 in the sleeve body and in cover 15, wherein container 11, which is preferably designed as a steam cooking bag, is advantageously held with its end 11' with the opening away from closing device 10.

An annular slit opening is formed between sleeve body 20 and retaining element 12 at the one front end 17 of closing device 10, while the opposite front end 18 is closed, with sleeve body 20 fixed to retaining element 12 by a detachable fastening means 19. This fastening means 19 is composed for example of at least one cam in the retaining element and a slit in the sleeve body or vice versa, with the cam penetrating into the slit. Conversely, retaining element 12 advantageously contains a longitudinal recess 13, which is arranged such that the retaining element can be bent inwards against the lower longitudinal slit 16. Additionally, there is a projecting flap 14 each side of retaining element 12.

Container 11 can be pushed into the open position of cover 15 in this annular opening of front end 17, by upper end 11' being bent, and in so doing a bend radius being formed which corresponds approximately to that of this annular opening. It can then be pushed in until its entire width is pulled over retaining element 12, as illustrated in FIG. 1. During removal, the container can in turn be pushed or pulled out simply when cover 15 is opened.

Sleeve body 20 achieves almost 360° coverage surrounding container 11 in the closed position of cover 15, and does so approximately play-free over the entire width of the container. It is thus ensured that the inside of the container is hermetically sealed from the outside and thus raw or cooked food inside it can be kept fresh for a longer time without losing taste or nutritional value.

Moreover, a vacuum effect, preferably by shock cooling of the cooked food, can be achieved in the container using this hermetic sealing. This ensures a long storage life accompanied by intrinsic vacuum without using preservatives.

Depending on the application, this container 11 can be designed differently, and to achieve this, very advantageously a heat-resistant, microwave-compliant and/or pressure-stable bag known per se is used, by means of which all types of food can be cooked, eaten, preserved and/or transported.

Therefore, this bag should be resistant at temperatures above the boiling point of water, i.e., at temperatures greater than 100° C., and/or at excess pressures of approximately 0.5 bar. Additionally, its composition should be such that it does not become damaged in a microwave device, nor does it give off any contamination whatsoever Vegetables, rice, fish, meat, fruit, carbohydrates or even foods in liquid form such as soups, sauces, creams and many others are suitable. These foods can be cooked, individually or in combinations of two or more together, in a container.

Container 11, usually produced from a transparent, flexible, plastic, consists of an opening and two side walls at its top end 11'. At bottom end 11", container 11 is provided with a folded base between the two side walls. This base can be unfolded and is thus designed running transverse to the side walls in order to increase the inner volume of the container.

Preferably, the container is pushed together, leaf-shaped, when not in use, while when in opened state it can stand on its side walls. Therefore, it is expediently manufactured from a sufficiently thick, stable plastic. If closing device 10 is mounted at the top end, the side walls are guided together adjacent to this retaining element 12, and clamped to this retaining element 12 by sleeve body 20, and thus container 11 is closed. Furthermore, ribs 22 are arranged in rows on both sides of the sleeve body and the cover, to improve manual holding.

In the method according to the invention for cooking food in container 11, this closing device 10 is equipped with a pressure relief valve 25 by which container 11 is opened at a specific excess pressure of the medium or closed when the excess pressure drops.

To form this pressure relief valve 25, a modifiable distance a can be produced partially transverse to the longitudinal extension of sleeve body 20, between inner retaining element 12 and sleeve body 20, which distance is increased as a result of the volume dilatation when the excess pressure of the medium of container 11 increases, and can thereby open the container. As a result of this opening, the excess pressure in the container falls again and thus the volume dilatation of the container is reduced, as is distance a accordingly, with the result that the container is closed again. This opening and closing of the pressure relief valve or of the container is then repeated incrementally several times or by a one-off opening, and actually until the food has finished being heated, for example in a microwave device or a steamer.

In so doing, this pressure relief valve 25 functions such that, during cooking due to the medium being heated by the air and/or steam therein, container 11 expands like a balloon, and when a specific excess pressure, for example 0.2 bar, is reached, the container causes the distance from sleeve body 20 to increase.

Advantageously, sleeve body 20 is provided with an adjustment means 25 which is designed such that this distance a between same and retaining element 12 can be changed automatically. The adjustment means 25 surrounds the retaining element 12 in the unpressurized starting position in approximately play-free manner, with the result that the container is closed, even if cover 15 is in the open position, as according to FIG. 1. On the other hand, when in excess pressure state, this adjustment means 25 is pressed outwards from container 11.

This adjustment means 25 of sleeve body 20 is formed by two spreading arms 26, 27 which extend from the center region of the sleeve body 20 up to an end of the retaining element 12 on the front end 17.

Preferably, these spreading arms 26, 27 and the remaining sleeve-shaped part of sleeve body 20 are manufactured from one material. However, they could be produced separately from one another, and each coupled by a corresponding spring-loaded joint. These spreading arms 26, 27 are arranged on both sides of retaining element 12 and running in the same direction as these. However, they are designed flexible and can be pressed outwards. At the top and bottom they each form a longitudinal slit 16, 28, wherein the top serves as guide groove for a cam 15' of cover 15, in order that this is longitudinally guided faultlessly. Furthermore, there is a stop 27' projecting outwards on each end side of the spreading arms, through which cover 15 cannot be pushed away from the sleeve body.

In the unpressurized starting position, these two opposing spreading arms 26, 27 surround retaining element 12 approximately parallel to same. When container 11 is assembled, these spreading arms 26, 27 are bent outwards by same in the excess pressure state, as is apparent in FIG. 1, with the result that the container is at least partially open, creating a distance a from retaining element 12 at the end sides of the spreading arms.

Figure 4:
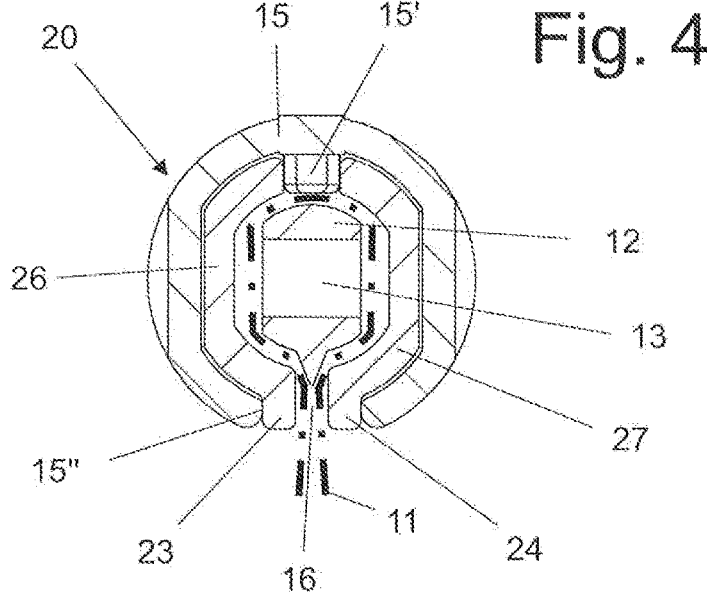
FIG. 4 is a cross-section along the line IV - IV of the closing device according to FIG. 3.

In the cross-section of closing device 10 shown according to FIG. 4, in which cover 15 is pushed into the closed position, a part of container 11 is indicated by a dotted line, with the container guided through longitudinal slit 16 and about retaining element 12 and again through the longitudinal slit. The two opposing spreading arms 26, 27 each have a guide rail 23, 24 in this longitudinal slit 16, which rails are in sliding contact on the outside with an end face 15" in the slit of cover 15. Moreover, this longitudinal recess 13 of retaining element 12 can still be seen.

The invention is sufficiently disclosed using the above embodiment example. However, it could be explained further using other variants. In this way, this adjustment means in the sleeve body could be designed as a spring-loaded plate element or the like, in which the distance between this and the retaining element could be changed automatically, wherein this plate element would be pressed into the closed position by a spring.

This closing element on the sleeve body could in theory also be omitted, or be arranged as a type of cover, adjustable by longitudinal displacement and/or pivoting. In this way, instead of this cover, a frame or the like, surrounding the sleeve body, which could be locked in place in the closed position surrounding the sleeve body, and unfolded for opening, could be provided.

The invention claimed is:

1. A closing device for a container having an opening, comprising:

at least one inner longitudinal retaining element;

at least one sleeve body outward of the at least one inner longitudinal retaining element, the at least one sleeve body defining a longitudinal slit, the at least one inner longitudinal retaining element and the at least one sleeve body defining a passage therebetween for guiding, together with the longitudinal slit, part of the container into engagement with the closing device, wherein the at least one inner longitudinal retaining element and the at least one sleeve body are configured to form a pressure relief valve by means of which the container is brought into an open position at a specific excess pressure of medium in the container during heating, and is brought into a closed position when the excess pressure drops during heating; and at least one cover movable forwards and backwards on the at least one sleeve body.

2. The closing device according to claim 1, wherein to form the pressure relief valve, the at least one inner longitudinal retaining element and the at least one sleeve body cooperate to define a modifiable distance at least partially transverse to a longitudinal extension of the at least one sleeve body and between the at least one inner longitudinal retaining element and the at least one sleeve body.

3. The closing device according to claim 2, wherein the closing device is configured such that the modifiable distance increases as a result of volume dilatation of the container when the excess pressure of the medium in the container increases, and the container thereby is brought into the open position, and the modifiable distance decreases when the excess pressure drops and the volume dilatation of the container is reduced and the container is brought into the closed position.

4. The closing device according to claim 2, wherein the at least one sleeve body comprises adjustment means for automatically changing the modifiable distance between the at least one inner longitudinal retaining element and the at least one sleeve body.

5. The closing device according to claim 4, wherein the adjustment means surrounds the at least one inner longitudinal retaining element in an unpressurized starting position such that the container is closed.

6. The closing device according to claim 4, wherein the adjustment means surrounds the at least one inner longitudinal retaining element in an unpressurized starting position in an approximately play-free manner, such that the container is closed.

7. The closing device according to claim 4, wherein the adjustment means comprise spreading arms which, in an unpressurized starting position, are oriented in a direction of the at least one inner longitudinal retaining element in the closed position of the container, and provide an increase in the modifiable distance (a) to the at least one inner longitudinal retaining element in a spread position, in which the container is at least partially open.

8. The closing device according to claim 7, wherein the spreading arms extend from a center region of the at least one sleeve body up to an end of the at least one inner longitudinal retaining element.

9. The closing device according to claim 7, wherein the spreading arms are arranged on both sides of the at least one inner longitudinal retaining element and extend in a common direction as the at least one inner longitudinal retaining element.

10. The closing device according to claim 7, wherein the spreading arms are flexible and pressable outward away from the at least one inner longitudinal retaining element.

11. The closing device according to claim 4, further comprising at least one adjustable closing element housed on the at least one sleeve body, the at least one adjustable closing element being configured to be displaceable from a position blocking the adjustment means into a position releasing the at least one sleeve body on at least one side of the adjustment means.

12. The closing device according to claim 1, wherein the at least one cover is configured as an adjustable closing element, being less than half as long as the at least one sleeve body, and having a longitudinal slit aligning with the longitudinal slit defined by the at least one sleeve body.

13. The closing device according to claim 1, wherein in the position closing the container, the at least one sleeve body is around the at least one inner longitudinal retaining element over its entire length.

14. The closing device according to claim 1, wherein in the position closing the container, the at least one sleeve body is around the at least one inner longitudinal retaining element over its entire length, in an approximately play-free manner.

15. The closing device according to claim 1, wherein in the position closing the container, the at least one sleeve body is outward of the at least one inner longitudinal retaining element over its entire length.

16. The closing device according to claim 1, further comprising:

an annular slit opening for pushing in the container formed between the at least one sleeve body and the at least one inner longitudinal retaining element at a one end; and detachable fastening means through which the at least one sleeve body is fixed to the at least one inner longitudinal retaining element, at an opposite end.

17. A closing device for a container having an opening, comprising:

at least one inner longitudinal retaining element;

at least one sleeve body outward of the at least one inner longitudinal retaining element, the at least one sleeve body defining a longitudinal slit, the at least one inner longitudinal retaining element and the at least one sleeve body defining a passage therebetween for guiding, together with the longitudinal slit, part of the container into engagement with the closing device, wherein the at least one inner longitudinal retaining element and the at least one sleeve body are configured to form a pressure relief valve by means of which the container is brought into an open position at a specific excess pressure of medium in the container during heating, and is brought into a closed position when the excess pressure drops during heating, and wherein to form the pressure relief valve, the at least one inner longitudinal retaining element and the at least one sleeve body cooperate to define a modifiable distance at least partially transverse to a longitudinal extension of the at least one sleeve body and between the at least one inner longitudinal retaining element and the at least one sleeve body.

18. The closing device according to claim 17, wherein the closing device is configured such that the modifiable distance increases as a result of volume dilatation of the container when the excess pressure of the medium in the container increases, and the container thereby is brought into the open position, and the modifiable distance decreases when the excess pressure drops and the volume dilatation of the container is reduced and the container is brought into the closed position.

19. The closing device according to claim 17, wherein the at least one sleeve body comprises adjustment means for automatically changing the modifiable distance between the at least one inner longitudinal retaining element and the at least one sleeve body.

\* \* \* \* \*